United States Patent [19]

Dadgar et al.

[11] Patent Number: 4,936,910

[45] Date of Patent: Jun. 26, 1990

[54] PROCESS FOR THE RECOVERY OF GOLD

[75] Inventors: Ahmad Dadgar; Charles C. Shin, both of West Lafayette, Ind.

[73] Assignee: Great Lakes Chemical Corporation, West Lafayette, Ind.

[21] Appl. No.: 395,490

[22] Filed: Aug. 18, 1989

[51] Int. Cl.$^5$ .............................................. C22B 11/04
[52] U.S. Cl. ...................................... 75/428; 75/722; 423/27; 423/38; 423/46; 423/DIG. 14; 423/DIG. 17; 210/620; 210/684; 210/688; 210/912
[58] Field of Search ...................... 75/101 R, 102, 108, 75/118 R; 423/27, 38, 46, 491, DIG. 14, DIG. 17; 210/688, 664, 912, 620

[56] References Cited

U.S. PATENT DOCUMENTS

| | | | |
|---|---|---|---|
| 267,842 | 11/1882 | DeFiganiere | 75/102 |
| 411,047 | 9/1889 | MacArthur | 75/102 |
| 3,147,219 | 9/1964 | Paterson | 210/62 |
| 4,190,489 | 2/1980 | Bahl et al. | 423/38 |
| 4,637,865 | 1/1987 | Sergent et al. | 204/111 |

OTHER PUBLICATIONS

Dissanayake et al., "Peat as a Metal-Trapping Material in the Purification of Industrial Effluents", Intern. J. Environmental Studies, 1981, vol. 17, pp. 233–238.
Viraraghavan et al., "Use of Peat in the Treatment of Oil-in-Water Emulsions", Proceedings of the 42nd Industrial Waste Conference May 12, 13, 14, 1987, pp. 465–474.
Kelly et al., "Use of Moss-Bags for Monitoring Heavy Metals in Rivers", Wat. Res. vol. 21, No. 11, 1987, pp. 1429–1435.
Coupal et al., "The Treatment of Waste Waters with Peat Moss", Wat. Res. vol. 10, 1976, pp. 1071–1076.
Gosset et al., "Batch Metal Removal by Peat", Wat. Res. vol. 20, 1986, pp. 21–26.
Cavalier et al., "Preparation of Metal-Impregnated Peat Carbons and Characterization of the Platinum Dispersion", Carbon, vol. 16, 1978, pp. 21–26.
Cameron et al., "Use of Mosses as Collectors of Airborne Heavy Metals Near a Smelting Complex", Water, Air, and Soil Pollution 7, 1977, pp. 117–125.
Fuchfman, "Peat Industrial Chemistry and Technology", Academic Press (New York, N.Y.; 1980) chaps. 2, 3 and 7.

*Primary Examiner*—Robert L. Stoll
*Attorney, Agent, or Firm*—Senniger, Powers, Leavitt and Roedel

[57] ABSTRACT

Process for recovering gold from a leachate containing $AuBr_4^-$ comprising contacting the leachate with a quantity of sphagnum peat moss under conditions effective to concentrate the gold on the moss, and thereafter recovering the gold from the sphagnum peat moss.

20 Claims, No Drawings

PROCESS FOR THE RECOVERY OF GOLD

BACKGROUND OF THE INVENTION

This invention relates to the field of extractive metallurgy, and more particularly to an improved process for recovery of gold from ores and gold-bearing leachates.

Conventionally, gold has been recovered from ores by leaching with alkaline cyanide solution. By reaction with cyanide ion and oxygen, the precious metal is converted to a cyanide complex (gold cyanide anion) which is taken up in the leaching solution. The precious metal is recovered from the cyanide leachate by any of a number of methods, including precipitation with a less noble metal such as zinc, direct electrowinning, ion exchange, and carbon adsorption. While widely practiced on a commercial scale, cyanide leaching suffers from well known disadvantages.

In an effort to overcome the disadvantages associated with cyanide leaching, other gold solubilizers have been proposed including halogens, halides and halide-bearing compounds. For example, Sergent et al. U.S. Pat. No. 4,637,865 describe a process for extracting a precious metal from a source material by contacting the source material with an aqueous leaching solution containing a leaching agent comprised of an N-halohydantoin compound. Leaching solutions are described containing 1,3-dibromo-5,5-dimethylhydantoin, 1-bromo-3-chloro-5,5 dimethylhydantoin and 1,3-dichloro-5,5-dimethylhydantoin.

Another commercial process for leaching of gold from a source material with an aqueous bromine leaching solution comprises contacting the source material with an aqueous bromine leaching solution having a pH of between about 2 and about 10 and containing between about 0.01% and about 20% by weight equivalent molecular bromine, between about 0.005% and about 20% by weight bromide ion, and between about 0.005% and about 30% by weight total halide ion to produce an aqueous leachate containing gold in the form a gold-bromide complex ion.

While bromine based leaching solutions offer advantages over cyanide leaching solutions with respect to extraction of the gold from the gold-bearing source material, there remains the problem of how to recover the gold dissolved in the leachate. Conventionally, the gold is recovered from the leachate by zinc or aluminum precipitation, ion exchange, carbon adsorption, or electrowinning. However, none of these methods is entirely satisfactory. Zinc and aluminum precipitation results in the formation of zinc and aluminum containing solutions which require proper disposal to avoid environmental problems. Conventional ion exchange resins are relatively expensive and must be regenerated. Gold bromide complex ion may be adsorbed on activated carbon, but the elution of gold from the activated carbon is relatively inefficient. Relative to ion exchange and zinc precipitation, electrowinning is not as efficient with respect to the recovery of gold. What is needed, therefore, is an improved process for recovering gold from leachates produced by bromine based leaching solutions.

SUMMARY OF THE INVENTION

Among the several objects of the present invention, therefore, may be noted the provision of an improved process for the recovery of gold from leachates produced by the dissolution of gold from a gold-bearing source into an aqueous leaching solution containing active bromine; and the provision of such a process which concentrates the gold in a form from which it may be readily recovered.

Further objects of the invention include the provision of an improved process for the recovery of gold from gold-bearing source materials; the provision of such a process which avoids the use of cyanide; the provision of such a process which utilizes an aqueous leaching solution containing a source of active bromine; and the provision of such a process which concentrates the gold in a form from which it may be readily recovered.

Briefly, therefore, the present invention is directed to a process for recovering gold from a leachate containing $AuBr_4^-$. The process comprises contacting the leachate with a quantity of sphagnum peat moss under conditions effective to concentrate the gold on the moss, and thereafter recovering the gold from the sphagnum peat moss.

The invention is further directed to a process for extracting gold from a gold-containing source material. The process comprises contacting the source material with an aqueous leaching solution containing active bromine to cause the gold to dissolve in the leaching solution, thereby producing a leachate which contains $AuBr_4^-$. The leachate is contacted with a quantity of sphagnum peat moss under conditions effective to concentrate the gold on the moss. Thereafter, the gold is recovered from the sphagnum peat moss.

Other objects and features will be in part apparent and in part pointed out hereinafter.

DESCRIPTION OF THE PREFERRED EMBODIMENTS

Surprisingly, it has been found that leachates containing the gold-bromide complex ion ($AuBr_4^{13}$) may be concentrated on sphagnum peat moss. Such leachates may be produced by contacting a gold-bearing source material with an aqueous leaching solution containing a source of active bromine (e.g., HOBr, $Br_3^-$, $Br_2$, $NaBrO_3$, 1-bromo-3-chloro-5,5-dimethylhydantoin, and 1,3-dibromo-5,5-dimethylhydantoin) under conditions effective to result in the formation of gold-bromide complex ion ($AuBr_4^-$). As used herein, the term sphagnum peat moss shall mean the living sphagnum moss and the peat produced by the decay of sphagnum moss.

Experimentally, it has been determined that sphagnum peat moss can concentrate in excess of 1000 ounces of gold per ton of sphagnum peat moss (i.e., in excess of about 32 milligrams of gold per gram of moss), and that at least 99.9% of the gold contained by the leachate can be recovered by the moss.

Prior to use, the sphagnum peat moss is dried, the leaves and stems of the sphagnum peat moss are chopped, and the chopped moss is then sieved to remove pieces having a size in excess of 10 mesh. After sieving, the moss may be additionally treated in any of a number of ways. Preferably, the chopped and sieved moss is washed with a protic acid such as HCl (0.3–1.5 M), and most preferably is washed with 0.5–1.0 M HCl (10 g of dry sieved moss/100 mL of HCl). The acid washed moss is then rinsed with deionized water until the filtrate reaches PH 4.

Alternatively, after removal of the +10 mesh pieces, the waxy materials of the moss may be extracted through the use of a solvent such as methanol/toluene (200 grams of dry moss/2176 grams of methanol and 1024 grams of toluene) under reflux (60° C.) for four hours. Thereafter, the material is filtered and dried (50° C.). The waxy materials may also be extracted through the use of a solvent such as tetrahydrofurfuryl alcohol. It has been found that at least in some instances delignification of the moss with $NaClO_2$ subsequent to solvent extraction will produce a material that will not concentrate gold from the leachate, and accordingly, it is presently preferred that the moss not be delignified subsequent to solvent extraction.

After treatment of the moss by means of an acid wash or solvent extraction, the moss is sieved to the proper size. It is presently preferred that the moss have a size less than 10 mesh and greater than 200 mesh; moss having a size less than 200 mesh may be so fine as to create an unacceptable pressure drop through a packed column or may present filtration problems. It is preferred that moss having a size of greater than 10 mesh be excluded to minimize column packing problems and to maximize the available moss surface area.

Gold bromide complex ion contained by the leachate may be concentrated on the moss batchwise or by continuous flow. Preferably, a conventional ion exchange column is packed with sphagnum peat moss, in the same manner as such a column is packed with ion exchange resin, and the leachate is passed through the column at room temperature and atmospheric pressure.

Exposure of the moss to solutions having a pH in excess of neutral tends to destroy the fibrous structure of the moss and thereby produce a moss material that will cause clogging of the ion exchange column or filtration problems. Accordingly, it is preferred that the leachate have a pH less than about 7 when contacted with the moss, and it is most preferred that the leachate have a pH between about 2 and 5 when contacted with the moss. When desired to decrease or increase the pH of the leachate, HBr and NaOH are preferred, respectively.

Provided that the amount of gold to be removed from the leachate does not exceed the maximum loading capacity of the moss (approximately 32 mg. Au/gm. moss), the contact time necessary to render the leachate barren of gold will be a function of the amount of gold to be recovered and the amount of moss used. For a given quantity of a leachate of known gold bromide complex ion concentration, an increase in the amount of moss contacted with the leachate will result in a reduction of the contact time necessary to render the leachate barren. Thus, the optimum contact time for any given leachate and a quantity of moss must be determined experimentally by contacting a series of leachates of constant volume and gold concentration with a quantity of moss for periods of different length. In addition, to minimize the amount of sphagnum peat moss required for gold recovery, it is preferred that the gold be concentrated on the moss until the maximum loading capacity of the moss is approached.

To date, sphagnum peat mosses acquired from a variety of sources have been found to effectively concentrate gold from leachates in accordance with the present invention. Samples evaluated to date have been acquired from separate sources in Canada and the United States.

After the gold is concentrated on the moss, it may be recovered therefrom in any number of ways. Most preferably, the moss is burned at about 750° C., for instance, in a muffle furnace. The ashes resulting therefrom are then smelted in a conventional manner to separate the gold from base metals and other impurities.

The following examples illustrate the invention.

EXAMPLE 1

A. Preparation of Sphagnum Peat Moss

A quantity of sphagnum peat moss was dried, the leaves and stems of the moss were chopped and the resulting product was sieved through a 10 mesh screen with the +10 material being discarded. The moss was then washed with 0.5M HCl (10 g of dry sieved moss/100 mL of HCl) and thereafter, rinsed with deionized water until the filtrate reached PH 4. The acid washed moss was then sieved to obtain moss having a size in the range of −10 to +200.

B. Preparation of Leachate

A leachate was produced by contacting an ore sample (5.0 g.) with a leaching solution (200 mL) containing 1.0 g. Geobrom TM 3400 and having a pH of about 5.0 and ORP of about 800 mv for four hours. Geobrom TM 3400 (trademark of Great Lakes Chemical Corporation; West Lafayette, Ind.) contains 34 wt% equivalent bromine, 14.3 wt% sodium bromide, 6.25 wt.% sodium hydroxide, and 45.45 wt.% water. It has a density of 13.6 g/mL, pH of 6.5–7.5, and vapor pressure of about 70 mm-Hg at 25° C. Geobrom TM 3400 (1.0 g.) was activated with 20 wt.% %Cl (0.5 g.) before its addition to the leach solution. After four hours of agitation, the leachate was separated from the residue and analyzed for gold by atomic absorption spectrophotometer. It contained 62.0 mg/L gold as gold bromide complex ion.

C. Recovery of Gold by Sphagnum Peat Moss

A sample (5 gram) of the acid washed (−10 to +200 mesh size) moss was contacted with the leachate (100mL). After 60 minutes contact time, the slurry was filtered and the barren solution was analyzed. In a like manner, the moss sample was then contacted with second, third and fourth leachates (100 mL each) produced using the Geobrom TM 3400 leach solutions, each containing 62.0 mg/L gold as gold bromide complex ion. After 60 minutes contact time with each solution, the slurry was filtered and the barren solution was analyzed. The gold recovery for all four contact times was better than 99.9%. The results are presented in Table I.

TABLE I

| | Gold Adsorption by Sphagnum Peat Moss | | | |
| --- | --- | --- | --- | --- |
| | Solution | | | |
| Solution No. | Volume mL | Analysis Au,mg/L | Recovery Au, % | Loading Au, oz/t |
| 1 | 100 | 0.04 | 99.94 | 36 |
| 2 | 100 | 0.02 | 99.97 | 72 |
| 3 | 100 | 0.02 | 99.97 | 108 |
| 4 | 100 | 0.02 | 99.97 | 144 |

EXAMPLE 2

A quantity of sphagnum peat moss was dried, the leaves and stems of the moss were chopped and the resulting product was sieved through a 10 mesh screen with the +10 material being discarded. The moss was then pretreated in one of two manners: (1) washed with 0.5M HCl (10 g of dry sieved moss/100 mL of HCl) and thereafter, rinsed with deionized water until the filtrate reached pH 4, or (2) refluxed (60° C.) in methanol/toluene (200 grams of dry moss/2176 grams of methanol and 1024 grams of toluene) for four hours, and thereafter filtered and dried (50° C.).

The acid washed and solvent extracted moss samples were then respectively divided into thirds and weighed. A first third was sieved to obtain moss having a size of −10 to +60 ("60 mesh"), a second third was sieved to obtain moss having a size of −10 to +100 ("100 mesh"), and the last third was sieved to obtain moss having a size of −10 to 200 ("200 mesh"). The +10 moss in each instance was discarded and the amount thereof was determined. An ion exchange column was packed with 50 grams of the 60, 100 and 200 mesh samples, respectively. Using a three speed Masterflex pump (Cole-Palmer Instrument Co., Chicago, Ill.), deionized water (200 mL) was passed through the column in three separate runs, one at each pump speed, and the elapsed time to pass 200 mL water through the column was measured for each sample. Table II presents the calculated therefrom for the three mesh sizes. Table II also presents the weight loss resulting from each sieve.

No significant differences were found in the flow-rate through the three mesh sizes at the three pump speeds. However, there are significant differences in the weight loss from the three sieves. Accordingly, the 200 mesh is more practical and economical due to its lower weight loss. It was not possible to pass water through non-sieved moss because of plugging problems.

TABLE II
Flow Rate of DI Water through Sphagnum Peat Moss

| Time, Min | Rate, mL/min |
|---|---|
| Solvent Extracted: 60 mesh; weight loss = 54% | |
| 5.48 | 36.49 |
| 2.50 | 80.03 |
| 1.46 | 137.24 |
| Acid Washed: 60 mesh; weight loss = 29% | |
| 5.28 | 37.91 |
| 2.41 | 83.21 |
| 1.40 | 142.76 |
| Solvent Extracted: 100 mesh; Weight loss = 30% | |
| 5.40 | 37.03 |
| 2.41 | 82.93 |
| 1.39 | 144.36 |
| Acid Washed: 100 mesh; Weight loss = 22% | |
| 5.31 | 37.65 |
| 2.41 | 82.94 |
| 1.42 | 141.16 |
| Solvent Extracted: 200 mesh; Weight loss = 10% | |
| 5.59 | 35.79 |
| 2.59 | 77.43 |
| 1.50 | 133.43 |
| Acid Washed: 200 mesh; Weight loss = 10% | |
| 5.57 | 35.92 |
| 2.56 | 78.22 |
| 1.47 | 136.45 |

EXAMPLE 3

A sample (1 gram) of sphagnum peat moss that had previously been sieved through a 10 mesh screen, acid washed and sieved to +200 mesh, as set forth in Example 1 was contacted with a leachate (200 mL; 237 mg Au/L) prepared as set forth in Example 1 for different time periods. After each contact time, the moss slurry was filtered, and the solution analyzed for gold. The contact time required for loading about 32 mg Au per gram of moss (maximum loading capacity) was about 2 hours. The results are presented in Table III-A.

It is important to note that the contact time is a function of the ratio of gold concentration in the leach solution to the weight of moss used. The contact time decreases as this ratio becomes smaller.

TABLE III-A
Contact time for Maximum Loading Capacity

| Experiment | Contact Time Min | Loading Capacity mg Au/g-moss |
|---|---|---|
| 1 | 30 | 9.6 |
| 2 | 60 | 16.2 |
| 3 | 75 | 20.2 |
| 4 | 90 | 27.2 |
| 5 | 105 | 30.2 |
| 6 | 120 | 32.0 |
| 7 | 135 | 32.0 |
| 8 | 150 | 32.0 |

In a similar experiment, a sample (5 gram) of sphagnum peat moss was contacted with a leachate (200 mL; 52.4 mg Au/L) prepared as set forth in Example 1 for different time periods. After each contact time, the moss slurry was filtered, and the solution analyzed for gold. The contact time required for loading all the gold from the leachate onto the moss was about 10 minutes. The results are presented in Table III-B.

TABLE III-B

| Experiment | Contact Time Min. | Effluent Analysis Au, mg | Recovery Au, % |
|---|---|---|---|
| 1 | 1 | 6.5 | 37.2 |
| 2 | 3 | 4.4 | 58.3 |
| 3 | 7 | 1.4 | 86.9 |
| 4 | 10 | 0.06 | 99.4 |
| 5 | 15 | 0.05 | 99.5 |
| 6 | 20 | 0.00 | 100.0 |

EXAMPLE 4

To determine the effect of temperature on the loading of $AuBr_4^-$ onto moss, different experiments were conducted at 25° C. and 54° C. Samples (1 gram) of sphagnum peat moss that had previously been sieved through a 10 mesh screen, acid washed or solvent extract⒠d as set forth in Example 2 and sieved to +200 mesh, were contacted with a leachate (200 mL; about 200 mg Au/L) prepared as set forth in Example 1. After 2 hours mixing, the loaded moss was separated from solution by filtration. The solutions were analyzed for Au and the loading capacities were calculated. In the temperature range of 25°–54° C. the loading capacity of $AuBr_4^-$ onto moss was independent of temperature. The results are presented in Table IV.

TABLE IV
Loading Capacity at Different Temperatures

| Moss | Temperature °C. | Loading Capacity mg Au/g moss |
|---|---|---|
| Solvent Extracted | 25 | 32.0 |
| Acid Washed | 25 | 32.0 |
| Solvent Extracted | 54 | 32.0 |
| Acid Washed | 54 | 32.5 |

EXAMPLE 5

Samples (1 gram) of sphagnum peat moss that had previously been sieved through a 10 mesh screen, acid washed or solvent extracted as set forth in example 2 and sieved to +200 mesh, were contacted for 2 hours with leachates (200 mL; 201.5 mg Au/L) prepared as set forth in Example 1 which differed as to PH. The solutions were separated from the loaded moss samples and analyzed for gold. The results are presented in Table V.

As the data indicate, the loading capacity of Au is independent of the pH of feed solution over the pH range of 0.6–6.0.

TABLE V

Effect of pH on AuBr$_4^-$ Loading Capacity

| pH | Loading Capacity mg Au/g-Moss |
|---|---|
| Solvent Extracted Moss | |
| 0.6 | 33.1 |
| 2.2 | 32.9 |
| 4.2 | 32.4 |
| 6.0 | 32.1 |
| Acid Washed Moss | |
| 0.6 | 32.8 |
| 2.0 | 33.1 |
| 4.2 | 32.9 |
| 6.0 | 32.4 |

EXAMPLE 6

Sphagnum peat mosses obtained from Lambert Peat Moss, Inc. (Quebec, Canada), Premier Brands, Inc. (Stamford, Conn.) and Fison Western Corporation (Vancouver, Canada) were prepared as set forth in Example 1 and evaluated for gold recovery using a leach solution prepared as set forth in Example 1. As the results in Table VI indicate, all three samples of sphagnum peat moss received from different sources have about the same loading capacity for gold.

TABLE VI

Loading Capacity of Gold for Different Sphagnum Peat Moss Samples

| Sphagnum Moss Source | Loading Capacity mg Au/g-Moss |
|---|---|
| Lambert | 32.5 |
| Fison | 33.0 |
| Premier | 32.0 |

EXAMPLE 7

To demonstrate the complete leaching and recovery of gold, a series of Geobrom ™ 3400 leach (see Example 1, part B) and recovery tests were performed to evaluate the maximum gold solubilized from a very rich black sand concentrate and its subsequent recovery by sphagnum peat moss. To recover the gold value the leach solution was passed through columns packed with sphagnum peat moss which was previously prepared as set forth in Example 2. The effluent, was analyzed to confirm the complete adsorption of gold onto the moss.

The loaded sphagnum peat mosses were removed from the columns, dried at 110° C., and then burned at 750° C. The ashes containing gold and some base metals were fire assayed and smelted. The results are presented in Tables VII and VIII. As the results in Table VIII indicate, the recovery of gold from the leach solution is better than 97%.

TABLE VII

Leaching Gold from Black Sand Concentrate Summary of Results

| Sample: | Black sand concentrate, 198.5 oz/t Au |
|---|---|
| Sample Size: | 200.0 g., 100 mesh |
| Leach Conditions: | |
| Head: | 22° C., 24 hours, 20% solids, pH = 1.5, ORP = 850 mv, 15 g Geobrom ™ 3400, 15 g NaBr. |
| Tail: | 22° C., 24 hours, 20% solids, pH = 1.7, ORP = 830 mv, 10 g Geobrom ™ 3400, 10 g NaBr. |

TABLE VII-continued

Leaching Gold from Black Sand Concentrate Summary of Results

| Metallurgical Balance | |
|---|---|
| Weight/Volume | Gold |
| Sample Weight 200.0 g | 198.5 oz/t |
| | 1359.8 mg |
| Filtrate (Head Leach) 2671.5 mL | 498 mg/L |
| | 1330.4 mg |
| Filtrate (Tail Leach) 3391.2 mL | 21.5 mg/L |
| | 72.9 mg |
| Residue 196.5 g | 17.0 oz/t |
| | 114.4 mg |
| Solubilized | 92.5% |

TABLE VIII

Recovery of Gold from Geobrom ™ 3400 Leach Solution Summary of Results

| Sample: | 6062.7 mL Geobrom ™ 3400 Leach solution, 1257.8 mg Au based on metallurgical balance. |
|---|---|
| Conditions: | 22° C., packed columns, acid washed moss, flow rate = 38.8 mL/min, pH = 2.0. |

| Recovery Balance | |
|---|---|
| Weight | Gold |
| Moss Weight, 101.15 g | 1257.8 mg |
| Ash Weight 6.45 g | 18.96% |
| | 1222.9 mg |
| Recovery | 97.2% |

In view of the above, it will be seen that the several objects of the invention are achieved and other advantageous results attained.

As various changes could be made in the above processes and products without departing from the scope of the invention, it is intended that all matter contained in the above description shall be interpreted as illustrative and not in a limiting sense.

What is claimed is:

1. A process for recovering gold from a leachate containing AuBr$_4^-$ comprising contacting the leachate with a quantity of sphagnum peat moss under conditions effective to concentrate the gold on the moss, and thereafter recovering the gold from the sphagnum peat moss.

2. The process of claim 1 wherein the gold is recovered from the sphagnum peat moss by burning the sphagnum peat moss to produce ashes, and thereafter smelting the ashes.

3. The process of claim 1 wherein the leachate has a pH of less than about 7.

4. The process of claim 1 wherein the leachate has a pH between about 2 and about 5.

5. The process of claim 1 wherein the moss is washed with a protic acid before it is contacted with the leachate.

6. The process of claim 5 wherein the protic acid is 0.5 M to 1.0 M HCl.

7. The process of claim 1 wherein the moss is contacted with a solvent to extract waxy materials present in the moss before the moss is contacted with the leachate.

8. The process of claim 7 wherein the solvent is a methanol-toluene mixture.

9. The process of claim 1 wherein the moss has a size less than about 10 mesh and greater than about 200 mesh.

10. The process of claim 1 wherein the moss is contacted with leachate until the loading capacity of the moss for $AuBr_4^-$ is approached.

11. A process for extracting gold from a gold-containing source material comprising contacting the source material with an aqueous leaching solution containing active bromine to cause the gold to dissolve in the leaching solution thereby producing a leachate which contains $AuBr_4^-$, contacting the leachate with a quantity of sphagnum peat moss under conditions effective to concentrate the gold on the moss, and thereafter recovering the gold from the sphagnum peat moss.

12. The process of claim 11 wherein the gold is recovered from the sphagnum peat moss by burning the sphagnum peat moss to produce ashes, and thereafter smelting the ashes.

13. The process of claim 11 wherein the leachate has a pH of less than about 7.

14. The process of claim 11 wherein the leachate has a pH between about 2 and about 5.

15. The process of claim 11 wherein the moss is washed with a protic acid before it is contacted with the leachate.

16. The process of claim 15 wherein the protic acid is 0.5 M to 1.0 M HCl.

17. The process of claim 11 wherein the moss has a size less than about 10 mesh and greater than about 200 mesh.

18. The process of claim 11 wherein the moss is contacted with leachate until the loading capacity of the moss for $AuBr_4^-$ is approached.

19. The process of claim 11 wherein the moss is contacted with a solvent to extract wax materials present in the moss before the moss is contacted with the leachate.

20. The process of claim 19 wherein the solvent is a methanol-toluene mixture.

* * * * *

UNITED STATES PATENT AND TRADEMARK OFFICE
CERTIFICATE OF CORRECTION

PATENT NO.  : 4,936,910

DATED  : June 26, 1990

INVENTOR(S) : Ahmad Dadgar and Charles C. Shin

It is certified that error appears in the above-identified patent and that said Letters Patent is hereby corrected as shown below:

Column 2, line 37, "$(AuBr_4{}^{13})$" should read ---$(AuBr_4{}^-)$---.

Column 4, line 15, "PH" should read ---pH---.

Column 4, line 31, "%CI" should read ---HCI---.

Column 5, line 19, "sample. Table II presents the calculated therefrom for the three mesh sizes." should read --- sample. Table II presents the elapsed time necessary to pump the 200 mL and the flow rate calculated therefrom for three mesh sizes. ---.

Column 6, line 39, "extracted" should read --- extracted ---.

Column 10, line 15, " wax" should read ---waxy---.

Signed and Sealed this

Thirty-first Day of March, 1992

Attest:

HARRY F. MANBECK, JR.

*Attesting Officer*  *Commissioner of Patents and Trademarks*